United States Patent [19]
Lacorre et al.

[11] 3,944,902
[45] Mar. 16, 1976

[54] POINT BY POINT POSITIONING APPARATUS

[75] Inventors: Jean Lacorre, Nantes; Michel Champenois, St Sebastien S. Loire, both of France

[73] Assignee: Societe D'Etudes, Recherches Et Constructions Electroniques Sercel, Carquefou, France

[22] Filed: July 30, 1973

[21] Appl. No.: 383,866

[30] Foreign Application Priority Data
Aug. 17, 1972   France .................. 72.29426

[52] U.S. Cl. ............... 318/593; 318/594; 318/598; 318/685
[51] Int. Cl.² ...................................... G05B 11/18
[58] Field of Search ........... 318/593, 594, 685, 630, 318/598, 602

[56] References Cited
UNITED STATES PATENTS

| | | | |
|---|---|---|---|
| 2,940,031 | 6/1960 | Verhoeff .................. | 318/630 X |
| 2,941,136 | 6/1960 | Marantette et al. ......... | 318/685 X |
| 3,113,302 | 12/1963 | Goodman .................. | 318/685 X |
| 3,210,632 | 10/1965 | Benton et al. ............. | 318/630 X |
| 3,246,218 | 4/1966 | Centner et al. ............ | 318/598 X |
| 3,323,030 | 5/1967 | Ihaba et al. .............. | 318/594 X |
| 3,339,122 | 8/1967 | Sangster .................. | 318/630 X |
| 3,360,702 | 12/1967 | Lasley et al. ............. | 318/630 X |
| 3,449,754 | 6/1969 | Stutz ..................... | 318/594 X |
| 3,465,220 | 9/1969 | Rabian et al. ............. | 318/594 |
| 3,659,174 | 4/1972 | Bodin ..................... | 318/602 |

*Primary Examiner*—B. Dobeck
*Attorney, Agent, or Firm*—Alan H. Levine

[57] ABSTRACT

Pointwise positioning apparatus for positioning a movable assembly includes a small strip defining a series of positions corresponding to an electrical absolute position coding which co-operates with a movable assembly to produce a pulse signal when the movable assembly is or passes a predetermined coded position. A general control motor is coupled mechanically to a step motor, and a logic circuit actuates the general control motor until a first passage through the predetermined position, whereupon the general control motor is actuated in the opposite sense until the movement of the movable assembly reverses, and then the step motor is actuated until the movable assembly again reaches the predetermined position.

9 Claims, 5 Drawing Figures

POINT BY POINT POSITIONING APPARATUS

The present invention relates to a point by point positioning apparatus, in particular for machines intended to perform one or more predetermined operations at a series of points located in a space of two or three dimensions.

A particular example of a machine of this type is a machine for wiring electronic circuits. Such a machine includes a support for a wiring tool capable of being shifted in a plane by means of two movable assemblies along two respective perpendicular axes of coordinates, each assembly being driven by a motor system. It is necessary for each motor system to be controllable in such manner as to locate the tool support successively at different points of a two-dimensional grid of points, determined along each axis of coordinates by a standardized elementary step.

In U.S. Pat. No. 3,659,174 there is described a control system comprising, for each movable assembly, a detecting instrument of linear form constituted by a small strip of insulating material provided with transverse conducting lamellae, adjacent ones of which are very close to one another. Each small strip is oriented substantially along the axis of coordinates corresponding to the movable assembly with which it is associated. Each movable assembly carries a member capable of producing a short circuit between any two adjacent lamellae of its strip. An electronic logical circuit detects the onset of the short circuit between any two adjacent lamellae, corresponding to a predetermined working position, and this information is used to control the motor system.

In the said U.S. patent the stopping of the movable assembly is effected after a rapidly converging hunting about the desired position, determined by two adjacent lamellae of the strip.

The arrangements described in the U.S. patent furnish an absolute position coding. They give full satisfaction when the surface to be wired is not very large and when the elementary step separating the working points is not too small, this elementary step being, on the strip, the step of the intervals between lamellae, whilst the dimensions of the surface to be wired are in agreement with the maximum travel of each movable assembly.

In contrast, when the ratio between the maximum travel of a movable assembly and the step of the strip increases appreciably, it is not possible to increase the speed of displacement of the movable assembly in the same way, that is to say to alter the characteristics of the motor system whilst maintaining the same precision of stopping.

Since the wiring operations necessitate frequent to and fro movements of each movable assembly over a major part of its maximum travel, it follows that on average the wiring operations are the longer the larger the surface to be wired and the smaller the elementary step of the wiring.

In general this difficulty is encountered in machines for performing point by point operations, which are controlled in a numerical manner, for example boring and reaming machines. In such machines the resolution of the numerical control corresponds to an extremely small elementary step, whilst the dimensions of the parts treated are often very large.

The object of the present invention is to provide apparatus for point by point positioning along an axis of coordinates, which enables the difficulty referred to above to be easily resolved.

As explained above, a linear detection instrument such as a small strip is orientated substantially along the axis of coordinates, and comprises a series of materialized positions corresponding to an electrical absolute position coding. The detecting instrument cooperates with the movable assembly to furnish a specific piece of electrical information when the said movable assembly is in or passes into a predetermined position selected from the said series. A logical circuit controls the motor system in response to this electrical information to effect the positioning of the movable assembly.

In accordance with an essential feature of the present invention, the motor system comprises a general control motor coupled mechanically to a step by step motor. The logical circuit actuates the general control motor as far as a first passage into the predetermined position and thereupon it actuates the step by step motor for a second passage into the said predetermined position.

By a general control motor is meant a motor of any type capable of being controlled electrically so as to be stopped, or to operate in one direction, or to operate in another direction. There may or may not be a relation between the electrical control signals and the operating variables of the motor.

In accordance with another feature of the invention the control polarity of the general control motor is reversed after the first passage into the predetermined position, until the movable assembly is practically stopped, after which the step by step motor is actuated in the appropriate sense as far as a second passage into the predetermined position.

In accordance with another feature of the invention the stopping of the movable assembly, after the first passage, is detected by reversal of the direction of rotation of the step by step motor, which operates as a polyphase alternator when it is not being fed. This reversal of direction of rotation is detected in the form of a change in sign of the phase displacement of two voltages on adjacent windings of the step by step motor which is not being fed.

In accordance with another feature of the invention, feeding of the general control motor is maintained for a minimum period of time notwithstanding that the first passage into the predetermined position has taken place, after which the reversal of feed polarity is at once effected if the first passage into the predetermined position has already taken place. In the contrary case, the procedure is normal. This makes a sufficient period of time available for detection of the reversal of movement of the movable assembly before the second passage into the predetermined position.

In accordance with another feature of the invention the step by step motor is actuated for a selected number of steps after the second passage into the predetermined position, which permits positioning which has practically the precision and flexibility of the absolute coding, whilst having a resolution substantially equal to that of the step by step motor.

In the accompanying drawings.

Figure 1:
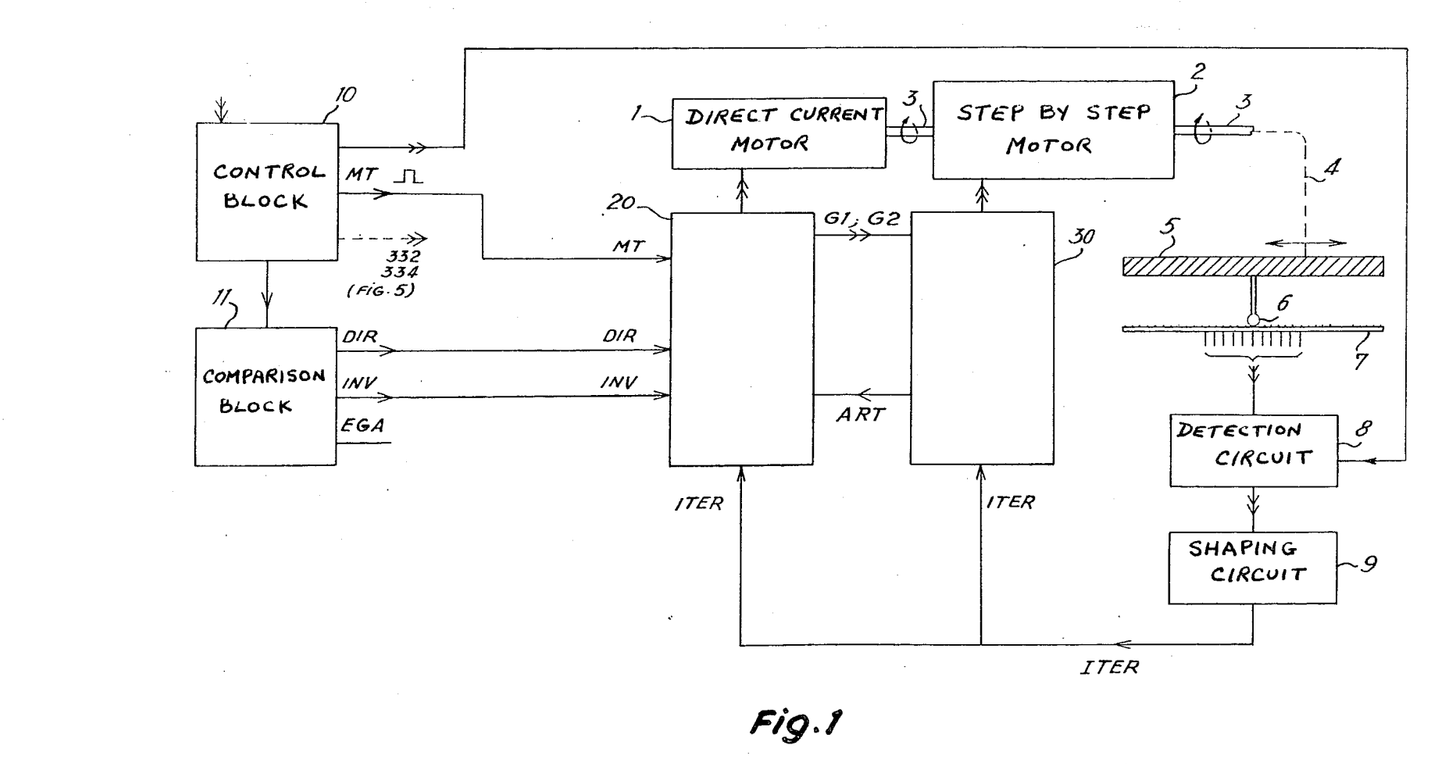
FIG. 1 illustrates diagrammatically, partly in detail, positioning apparatus in accordance with the present invention.

In FIG. 1, a direct current motor 1 and a step by step motor 2 are mechanically coupled coaxially so as to control, via a mechanical connection 4 illustrated diagrammatically, and assumed to be without slip, translational displacement of a movable assembly 5. The movable assembly 5 is solid with a roller 6 which moves on a small strip 7 carrying transverse metallic lamellae. The movement of the roller 6 is perpendicular to the transverse orientation of the lamellae.

The roller and the lamellae are arranged in one of the configurations described in U.S. Pat. No. 3,659,174, in particular with reference to FIGS. 1, 2, 3 and 4 of that specification. The lamellae are connected to a detection circuit 8 actuated so as to detect selectively the production by the roller 6 of a short circuit between two predetermined lamellae. These two predetermined lamellae therefore effect the absolute coding of a position which in the present specification and claims will be called the predetermined position, or desired position, except in the case of FIG. 5 for reasons that will appear hereinafter.

Various ways of interconnecting the lamellae and the detection circuit 8 are described in U.S. Pat. No. 3,659,174 specification. In the case of the present application it is thought that it is within the ability of a person skilled in the art to perform the transcoding operation which consists in passing from a predetermined position, coded in numerical form, to the selection of the two conductors connected to the two lamellae defining this predetermined position in an absolute manner.

Figure 4:
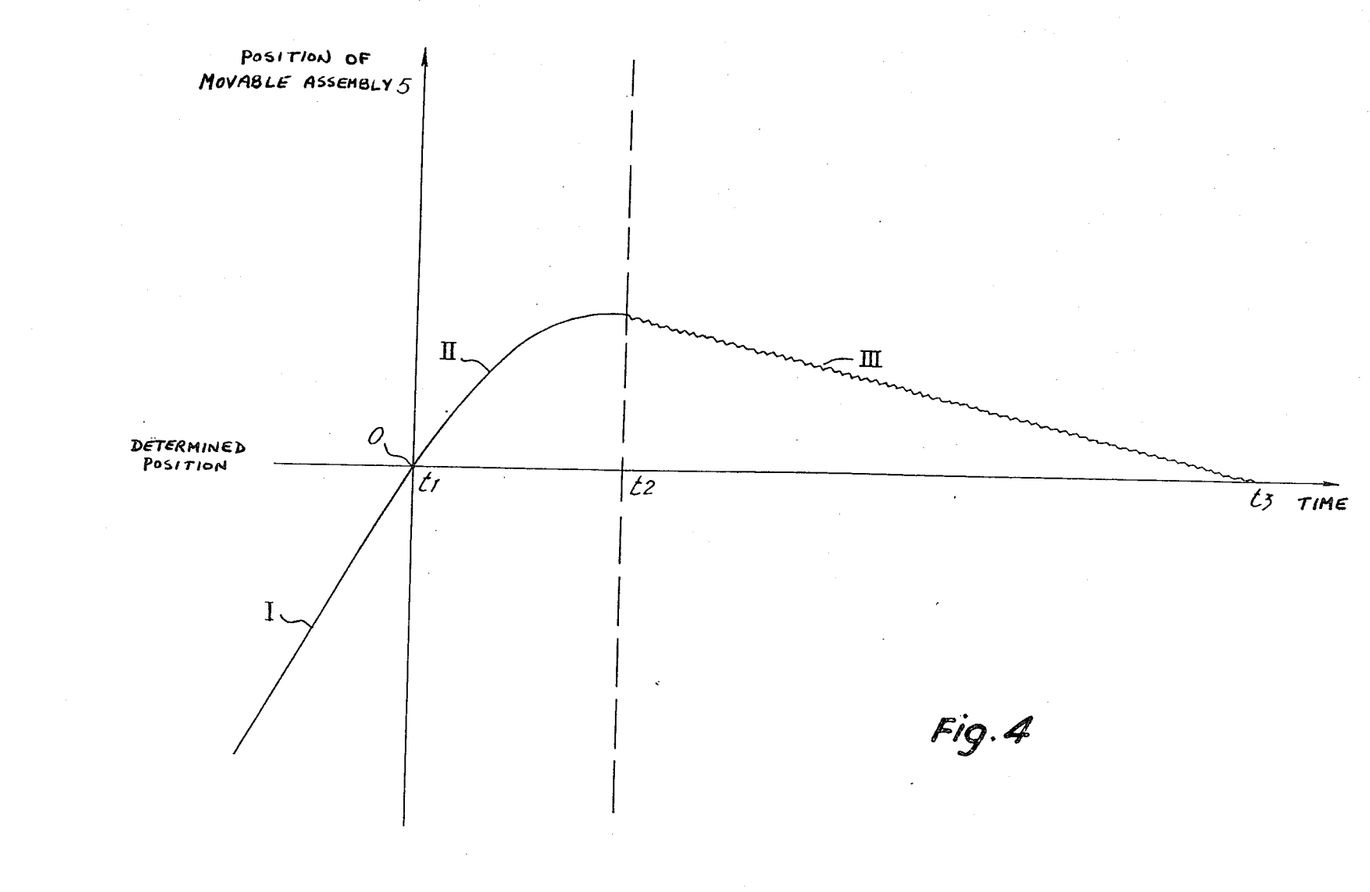
FIG. 4 is a graph showing the displacement of the movable assembly as a function of time, the step by step motor being controlled by the circuit shown in FIG. 3.

It is particularly advantageous to use lamellae arranged as shown in FIG. 4 of U.S. Pat. No. 3,659,174, which permits numerical position coding in a binary decimal code, in accordance with FIG. 5 of the said patent.

In the latter case, for each position capable of being coded numerically, one of the adjacent lamellae associated with the decade receives a ONE logical level of voltage, whilst the other is brought to this ONE logical level when the short circuit takes place.

In one embodiment, the detection circuit 8 includes the circuits shown in FIG. 5 of U.S. Pat. No. 3,659,174, Viz. a decade circuit for applying, in accordance with the decade furnished by the numerical code, the ONE logical level to all the interconnected lamellae of the decade concerned, and a units circuit for selecting the lamellae capable of being brought to the ONE level by short circuit, and which corresponds to the units figure of the numerical code.

In this manner, for each value of the numerical position code the short circuit is detected in the form of the occurrence of a ONE level at the output of the units circuit. The output of the units circuit is connected to a first monostable trigger circuit (not shown in the detector circuit 8) having a pulse duration sufficient to prevent two successive short circuits, produced by rebounding of the roller when the direction of displacement of the movable assembly remains the same, from being considered separately.

In the shaping circuit 9 a second monostable trigger circuit produces a signal or pulse of predetermined duration after the start of the first short circuit, viz. after the leading edge of the output signal from the first monostable trigger circuit.

Hence, each time that the roller 6 solid with the movable assembly 5 short circuits the two adjacent lamellae corresponding to the position determined by the numerical coding, the shaping circuit furnishes a pulse of predetermined duration which will be termed the ITER signal or pulse.

In FIG. 1, a control block 10 receives, for example from a scanner of perforated tape, a piece of information relating to the new predetermined position to be attained. At the end of the scanning of this coded information a pulse signal MT is furnished by the control block. Furthermore, the control block 10 acts on the detection circuit 8 to condition it to select the two adjacent lamellae corresponding to the new predetermined position, for example in the manner explained above.

Moreover, the control block 10 tranmits the information about the new predetermined position to a comparison block 11, which compares this information with the position previously attained and furnishes a continuous level on the line DIR, the line INV, or the line EGA, according to whether the new position necessitates, relative to a reference orientation arbitrarily determined on the axis of coordinates, a movement in the forward sense, a reverse movement or no movement.

If the line EGA is activated, an operation, for example wiring, is effected without change of position.

If one of the two lines DIR and INV is activated, the position of the movable assembly 5 must then be altered. Positioning in according with the invention will now be described.

Figure 2:
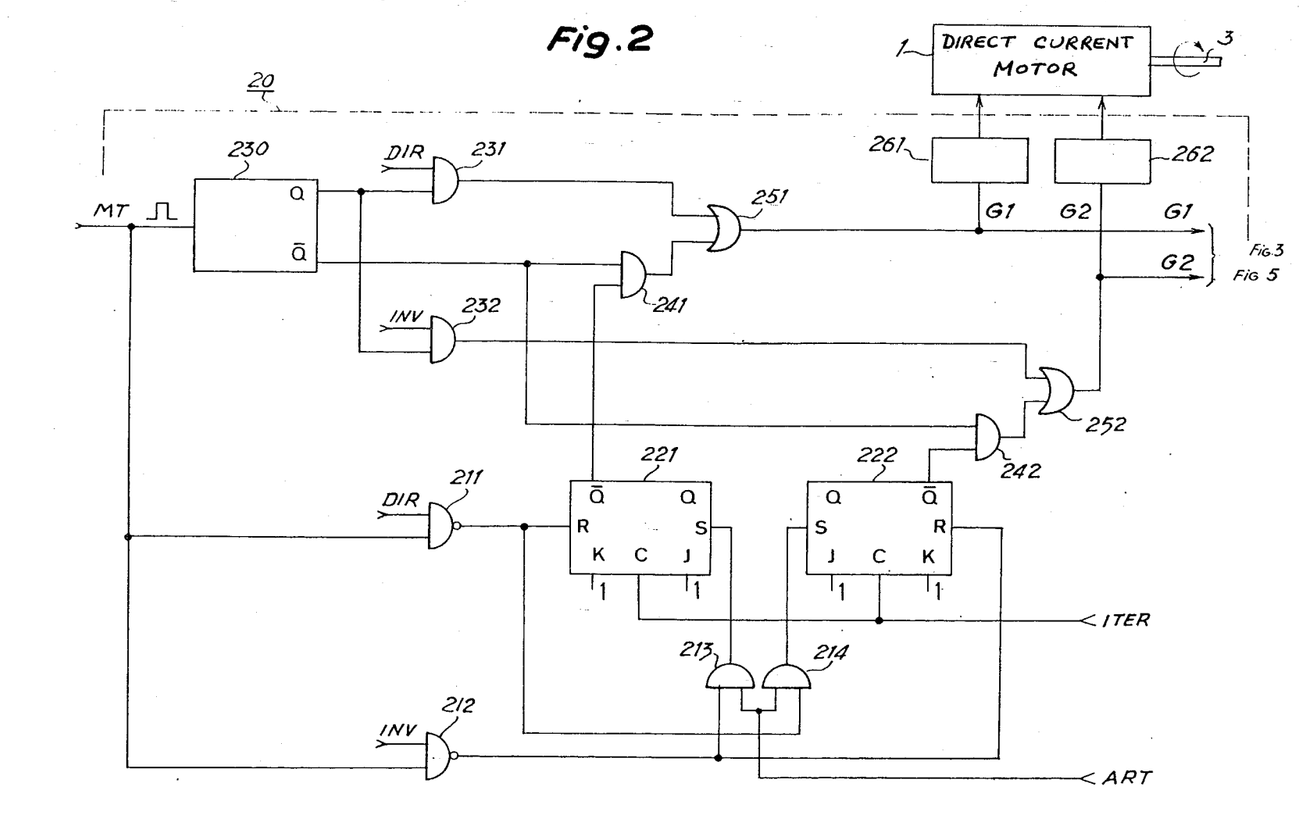
FIG. 2 shows in detail the control circuits for the general control motor.

In FIG. 1, the direct current motor 1 is controlled from the signals MT, DIR, INV and ITER through the intermediary of a circuit 20 the detailed arrangement of which is shown in FIG. 2. The circuit 20 also receives a signal ART which is representative of the change in the direction of movement of the movable assembly 5, after the first passage to the predetermined position. It also furnishes two signals G1 and G2 which are the logical levels for controlling the operation of the direct current motor 1 in one direction or the other. The direct current motor 1 functions as the general control motor, as defined above.

The step by step motor 2 is controlled by the circuit 30 in accordance with the state of the signals G1 and G2 furnished by the circuit 20. Very advantageously, the step by step motor 2 is also used to produce the signal ART which is representative of the change in the direction of movement of the movable assembly 5.

Figure 3:
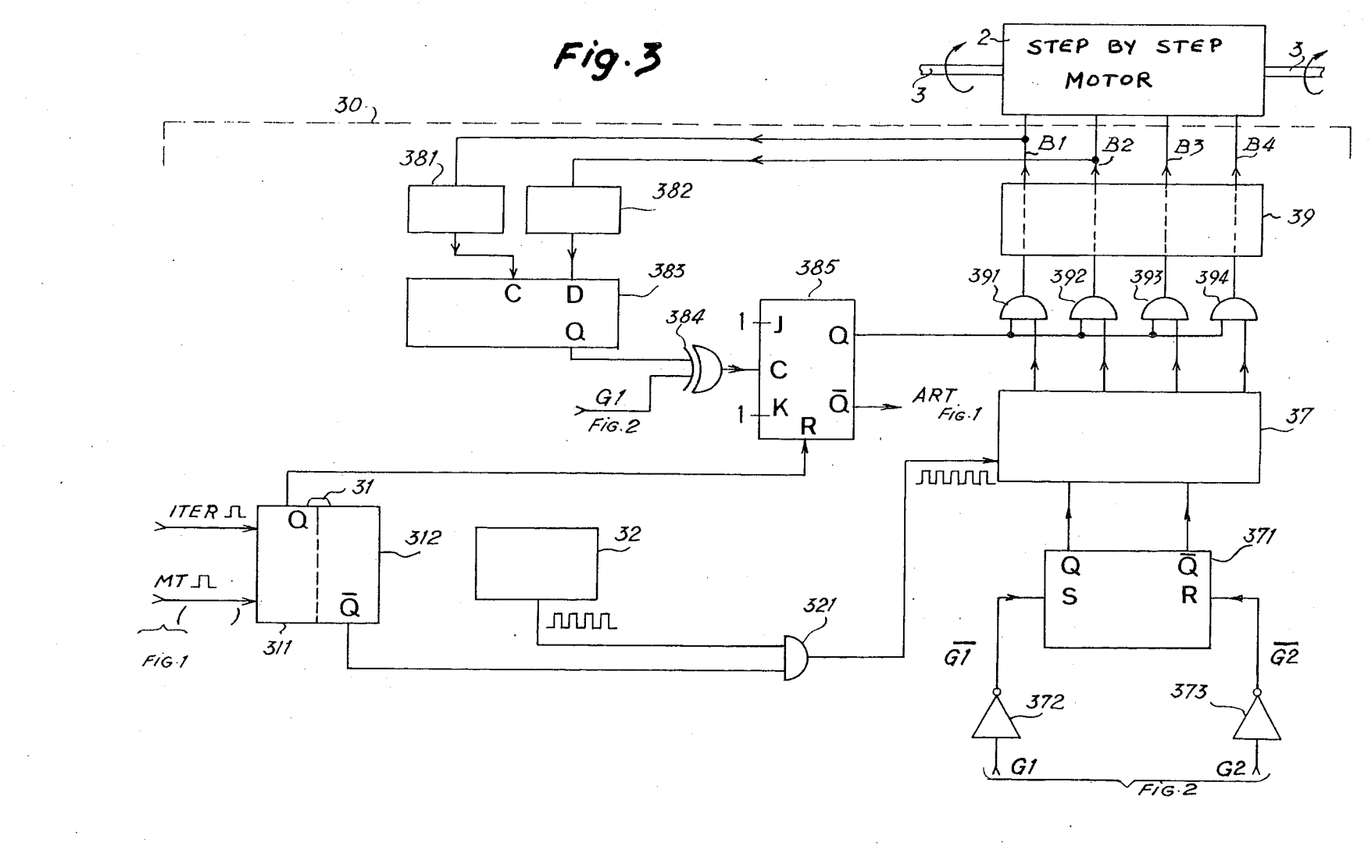
FIG. 3 shows in detail a first arrangement of the control circuits for the step by step motor.
Figure 5:
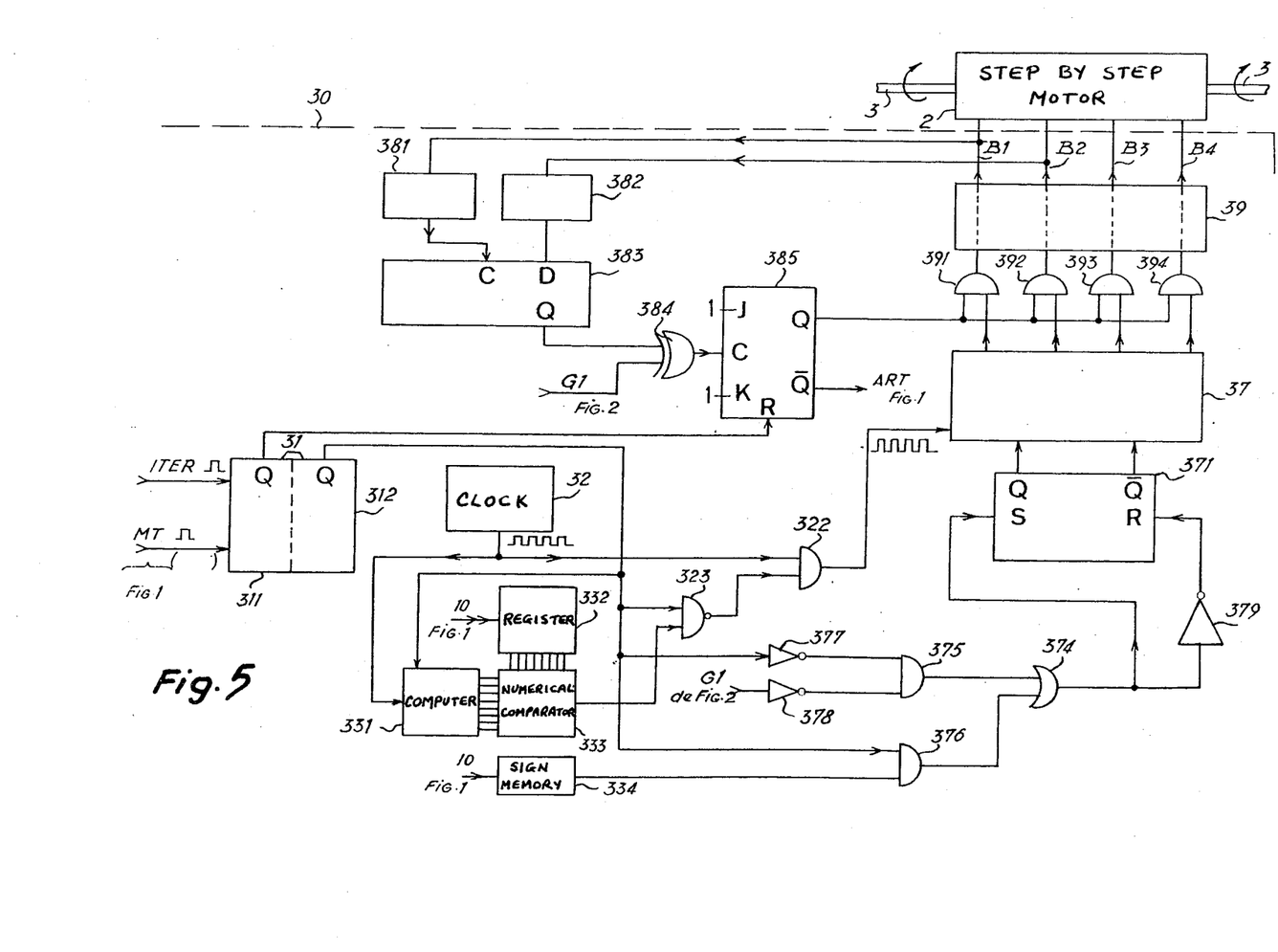
FIG. 5 shows a second arrangement of the control circuit for the step by step motor.

FIGS. 3 and 5 illustrate respectively a practical form of the control circuit 30, and an improved modification which permits positioning finer than the step of the small strip.

In FIG. 2, the signal MT, which is a pulse representative of the end of scanning the information about the new position, consequently indicates that the logical circuits 10 and 11 are ready for the attainment of the new position, as is also the detection circuit 8 which is ready to detect a short circuit between the two lamellae that define the position determined by the numerical coding. It will now be remembered that the start of this short circuit gives rise to the occurrence of a pulse ITER.

The pulse signal MT is applied to two NO-AND gates 211 and 212, the other inputs of which receive respectively the signal DIR and the signal INV. The outputs of the NO-AND gates 211 and 212 are applied respectively to the input R for clearing two bistable trigger circuits J-K 221 and 222 respectively. The inputs S for presetting the trigger circuits 221 and 222 are connected respectively to AND gates 213 and 214, which each receive the signal ART representative of the reversal of direction of movement of the movable assembly after the first passage to the desired position. The signal ART, which is generated in a manner which will be described in detail with reference to FIG. 3, passes from the level ONE to the level ZERO at the instant of reversal of the direction of movement. The AND gates 213 and 214 receive respectively the output from the gate 212 and the output from the gate 211.

The bistable trigger circuits 221 and 222 have their inputs J and K maintained permanently in state 1 whilst their clock inputs C each receive the signal ITER.

The signal MT is also applied to a monostable trigger circuit 230 the output Q of which is applied to two AND gates 231 and 232 which receive respectively the signal DIR and the signal INV. The outputs $\overline{Q}$ of the bistable trigger circuits 221 and 222 are applied respectively to AND gates 241 and 242 each of which receives the ouput $\overline{Q}$ of the monostable trigger circuit 230.

The outputs of the gates 231 and 241 are united in an OR gate 251 to furnish the logical level G1 for controlling, through the intermediary of a power circuit 261, the actuation of the direct current motor 2 in the forward sense. The outputs of the AND gates 232 and 242 are united in an OR gate 252 to furnish a logical signal G2 for controlling, through the intermediary of a power circuit 262, the actuation of the direct current motor 2 in the reverse sense. The signals G1 and G2 are also fed to the control circuit of the step by step motor in FIG. 3 or FIG. 5.

The rising edge of the signal MT has the effect of resetting the output $\overline{Q}$ of one of the bistable trigger circuits 221 and 222 to the ONE state, according to whether the signal DIR or the signal INV is present.

The signal ART being at level 1, so long as the first pulse ITER has not arrived and the direction of movement of the movable assembly has not reversed, the inputs S of the bistable trigger circuits 221 and 222 each receive the input R from the other. Consequently, the two trigger circuits are in complementary states, when the signal ART is at level 1.

Furthermore, the output Q of the monostable trigger circuit 230 produces, during a predetermined period of time, a ONE level at the output of one of the gates 231 and 232 according to whether the signal DIR or the signal INV is at the ONE level.

Assume that the signal DIR is at level 1. During the time predetermined by the monostable trigger circuit 230 the AND gate 231 furnishes, through the intermediary of the OR gate 251, the signal G1 for controlling the direct current motor 1 in the forward sense. After this, the output $\overline{Q}$ from the monostable trigger circuit 230 is at the ONE level, and on being combined with the output $\overline{Q}$ from the memory trigger circuit 221 in the AND gate 241 it again furnishes the control signal G1 for the motor 1, in the forward sense.

This is produced until the first pulse ITER arrives at the inputs C of the bistable trigger circuits 231 and 232. At this instant the states of the two trigger circuits 221 and 222 are reversed.

Consequently, the control circuit 20 in FIG. 2 responds to the pulse MT by controlling the direct current motor 1 for a mininum period of time. This period, which is regulated by the monstable circuit 230, is selected to be sufficient for the motor system to gather speed and for the movable assembly to pass the desired position sufficiently for the detection of the reversal of its direction of movement to occur under good conditions.

After the interval of time furnished by the monostable trigger circuit 230, the actuation of the direct current motor 1 depends on the bistable trigger circuits 221 and 222. Initially, these circuits are put by the pulse MT into a state such that they control the actuation of the direct current motor in the same sense as the AND gates 231 and 232. The direction of operation is reversed by the occurrence of the pulse ITER.

If the pulse ITER has arrived during the interval of time in which the control is furnished by the gates 231 and 232 (case in which the preceding position is very close to the desired position) the end of the pulse furnished by the monostable trigger circuit 230 is immediately translated into a reversal of the direction of operation of the direct current motor, since the trigger circuits 221 and 222 have already changed state.

In contrast, if at the end of the pulse furnished by the monostable trigger circuit 230 the signal ITER has not yet occurred, the direct current motor contines to operate in the same direction until the signal ITER occurs.

When the reversal of the direction of movement of the movable assembly is detected, the signal ART passes to Zero level, which as the effect of putting the outputs $\overline{Q}$ of the two trigger circuits 221 and 222 to zero state, by applying a zero level to their inputs S. The direct current motor 1 is then no longer fed with current.

Summarising, after the occurrence of the pulse MT, the direct current motor 1 operates in the same direction as far as passage to the position determined by the numerical coding. At this instant, the supply of current to the direct current motor 1 is reversed so as to brake the movable assembly 5, until the passage of the signal ART to zero level indicates that the movement of the movable assembly 5 has changed direction. However, under the control of the pulse width of the monostable trigger circuit 230, the supply of current to the direct current motor 1 is maintained for a minimum period. This enables the movable assembly to have time to gather speed, thereby avoiding the effect that the reversal of the current supply to the direct current motor 1 produces a second passage in the reverse direction to the predetermined position before detection of the reversal of the direction of movement of the movable assembly 5, and the cessation of supply of current to the direct current motor 1.

In FIG. 3 are illustrated the step by step motor 2 and a practical form of its control circuit 30.

The step by step motor 2 is assumed to be of the type having four inductors, and it therefore includes four indicator supply lines B1 to B4 connected to a power circuit 39, which can be designed in known manner by a person skilled in the art.

It is known that a step by step motor responds to pulses in at least one of its inductors by turning through elementary steps, whilst the application of continuous voltages to the inductors produces a torque which arrests the step by step motor in the position attained.

Furthermore, it has been observed that in the absence of continuous voltage and pulse on these inductors, that is to say in the absence of feeding, the step by step motor behaves like a polyphase alternator.

In accordance with a particularly advantageous practical form of the present invention, two adjacent inductors B1 and B2 of the step by step motor are connected respectively to shaping circuits 381 and 382 in order to transform the alternating voltages induced in these inductors, in the absence of feeding, into synchronous logical signals of these voltages. The logical signals furnished by the respective outputs of the circuits 382 and 381 are applied to a bistable memory trigger circuit 383 of type D, respectively at the input D for the signal to be memorised D and at the clock input or memory control C. The state of the input D is taken into consideration by the rising edge of the signal applied to the input C. consequently, if the signal coming from B1 passes from zero level to the ONE level before the signal coming from B2, which may be regarded as an advance in phase, the output $\overline{Q}$ of the trigger circuit 383 remains in the zero state. In contrast, if the signal coming from B2 passes from the zero level to the ONE level before the signal coming from B1, the output Q remains at the ONE level. Consequently, the output Q of the memory trigger circuit 383 is representative of the phase displacement between the voltages generated in the windings B1 and B2 of the step by step motor 2 when this functions as a polyphase alternator driven by the direct current motor 1, without being fed. In the case of a four phase motor this phase displacement is ± 90 electrical degrees according to the direction of rotation of the step by step motor, and therefore according to the direction of movement of the movable assembly 5.

The output Q of the memory trigger circuit 383 is applied to an exclusive OR gate 384 which also receives the signal G1. The output of the exclusive OR gate 384 is applied to the input C of a bistable trigger circuit 385 of J-K type, the inputs J and K of which are permanently in state 1. As will be seen hereinafter, the function of the bascule J-K 385 is to control simultaneously the stopping of the direct current motor 1, by the signal ART of its output $\overline{Q}$, and the setting in movement of the step by step motor by its output Q, connected to a plurality of AND gates 391 to 394, in order to make each of these gates available. The AND gates cause the step by step motor 2 to be fed either with continuous voltages or with pulses, through the intermediary of the power circuit 39.

Of course, when the step by step motor is actuated it is necessary to prevent the change of state of the trigger circuit 385 in response to signals coming from the inductors B1 and B2. This may be effected in the shaping circuits 381 and 382.

The control circuit 30 in FIG. 3 also includes a computer 31 having two binary stages 311 and 312. The output Q of the first stage 311 and the output $\overline{Q}$ of the second stage 312 are represented in FIG. 3. The computer is reset to zero upon each occurrence of a pulse MT. Consequently, the output Q of its first stage 311 is at zero level. This output Q is applied to the clearing input of the bistable trigger circuit 385, which simultaneously causes the occurrence of a signal ART at the ONE level on the output $\overline{Q}$ of the bistable trigger circuit 385, thereby authorising the operation of the direct current motor 1 in the manner indicated hereinbefore, whilst the output Q of the bistable trigger circuit 385 is at zero level, which prevents feeding of the step by step motor 2, through the intermediary of the AND gates 391 to 394.

The occurrence of the first pulse ITER has the effect of causing the output Q of the first stage 311 of the computer 31 to pass to the ONE level. The bistable trigger circuit 385 then responds to its input C.

It will be assumed that the windings B1 and B2 are selected in such manner that the output Q of the memory trigger circuit 383 is at ONE level when the step by step motor is not fed and is driven in the forward sense, corresponding to a signal G1 at ONE level for the control of the direct current motor 1. Before the occurrence of the first pulse ITER, these two signals are both at ONE level or both at ZERO level. The output of the EXCLUSIVE OR gate 385 is therefore at ZERO. The input C of the bistable trigger circuit 385 then receives a rising signal edge when the direction of feeding of the direct current motor changes (change of state of G1 and occurrence of the first pulse ITER), and a falling signal edge when the direction of movement of the movable assembly 5, that is to say the direction of rotation of the motor system, changes (change of state of the output Q of the memory trigger circuit 383).

Consequently, in response to a change of state of the trigger circuit 383, the feeding of the direct current motor is interrupted by means of the signal ART, and the feeding of the step by step motor 2 is authorised. This takes place after the output of the exclusive OR gate 384 has indicated a change of direction of the movement of the movable assembly 5, after a change in the sense of feeding of the direct current motor 1, this being on condition that a first passage to the desired position has taken place.

So long as a second pulse ITER has not been applied to the computer 31, that is to say so long as a second passage to the desired position has not taken place, the output $\overline{Q}$ of the second stage of the computer 312 is at level 1. This output is applied to an AND gate 321 which also receives pulses from a pulse source or clock 32. These pulses are applied to a circuit 37 which also receives the outputs Q and $\overline{Q}$ of a bistable trigger circuit 371 of RS type, that is to say with clearing inputs.

The signal G1 is complemented in an inverter 372 and is applied to the input S for clearing the trigger circuit 371 to state TRUE. The signal G2 is complemented in an inverter 373 and is applied to the FALSE state setting input of the trigger circuit 371.

It is regarded as within the ability of a person skilled in the art to design the circuit 37, which permits the distribution of the control pulses furnished by the AND gate 321 over the four inductors B1 to B4 according to the desired direction of rotation, memorised by the bistable trigger circuit 371. It is merely noted that the step by step motor 2 can function only when the output Q of the bistable trigger circuit 385 is at level 1, and that at this instant the direction of rotation of the step by step motor must be the same as that of the direct current motor, which is memorsied in the bistable trigger circuit 371.

The graph in FIG. 4 illustrates the operation of the motor system as just described with reference to FIGS. 2 and 3. The axis of abscissae relate to time, whilst the axis of ordinates relates to the position of the movable assembly 5. The origin O of the axis of ordinates corresponds to the position determined by the absolute numerical coding.

The portion I of the graph corresponds to feeding of the direct current motor 1 in the sense appropriate for movement towards the desired position, whilst the step by step motor is not fed. At the instant $t_1$ (origin of the time axis) the movable assembly passes into the desired position with a certain acquired speed.

The direct current motor is then fed in the return sense, whilst the step by step motor is still not fed. There is therefore produced on the part II of the graph a braking of the movable assembly until the instant $t_2$, at which the reversal of the direction of movement of the movable assembly 5 is detected, advantageously by the reversal of the phase displacement produced on the windings B1 and B2 of the step by step motor operating as a generator.

At this instant, the direct current motor 1 is no longer fed, whilst the step by step motor is fed in the return sense. The part III of the graph corresponds to the return movement of the movable assembly 5 effected by the step by step motor towards the determined position. The determined position is attained at the instant $t_3$.

At this instant, the detection circuit 8 in FIG. 1 detects the passage of the movable assembly, and the shaping circuit 9 furnishes a second pulse ITER which, in the computer 31 in FIG. 3, causes the output $\overline{Q}$ of the second stage to pass to the zero state, and interrupts the supply of pulses to the circuit 37, which causes stopping of the step by step motor.

The stopped position is defined with great precision, since it is effected by about one step. The step by step motor 2 is then fed with continuous voltages, the torque for stopping it and for holding it in the position thus attained is extremely good.

The combination of a direct current motor and a step by step motor, with an absolute coding arrangement enables advantages to be taken of the high speed of the direct current motor, for the approach, whilst the step by step motor effects very precise positioning, with a high holding torque, at the position determined by the absolute coding.

In FIG. 5 is illustrated an interesting modification of the control circuit 30 for the step by step motor, in which the step by step motor is fed with a selected number of pulses again after the attainment of the position determined in absolute coding, in order to attain a desired coded position in relative manner with respect to the position determined in absolute coding.

In the lower part of FIG. 5 are located the elements that differ from the embodiment of FIG. 3.

Instead of the output $\overline{Q}$ of the second stage 312 of the computer 31, the output Q of this same stage 312 is used. It is applied as a condition of operation to a numerical computer 331, which receives at its computer input the output of the clock 32. The output Q of the second stage 312 is again applied to one input of a NO-AND gate 323, as well as to an inverter 377 and to an AND gate 376.

The output of the inverter 377 is connected to an AND gate 375, which receives also the signal $\overline{G1}$ obtained by an inverter 378 from the signal G1 coming from the circuit 20 of FIG. 2. The AND gate 375 therefore furnishes a signal $\overline{G1}$. $\overline{Q}$ 312, which is applied directly via an OR gate 374 on the one hand directly to the input S of the bistable trigger circuit 371 and on the other hand, after complementation by the inverter 379, to the input R of this trigger circuit.

The stage outputs of the numerical computer 331 are connected individually to a numerical comparator 333, which is connected also to the stage outputs of a register 332.

The register 332 and a one bit sign memory device 334 receive from the control block 10 in FIG. 1 a number of steps to be effected after attaining the position determined by the absolute numerical code, and a sign representative of the direction in which these steps should be taken. These two pieces of information are for example read on the perforated tape by the control block 10, in accordance with the absolute numerical code of position determined on the strip.

The output of the sign memory device 334 is applied as a second input to the AND gate 376. The output of the numerical comparator 333, which passes to the ONE level when the number of clock pulses counted by the computer 331 is equal to the number of steps present in the register 332, is applied as a second input of the NO-AND gate 323.

Assuming that the output Q of the second stage 312 of the computer 31 is at zero level, the output of the NO-AND gate 323 is at ONE level, and the output of the AND gate 322 applies the clock pulses to the circuit 37. At the same time the AND gate 376 has its output at zero level, whilst the AND gate 375 transmits the signal G1 to the input S of the trigger circuit 371 and the signal $\overline{G1}$ to the input R of this trigger circuit.

Before the trigger circuit 385 passes to the true state ($Q = 1; \overline{Q} = 0$), the direct current motor 1 continues to operate; hence $G1 = \overline{G2}$, and the trigger circuit 371 memorises the direction of operation of the direct current motor 1.

At the instant at which the trigger circuit 385 passes to the true state, the situation is therefore the same as in the form of the circuit 30 shown in FIG. 3. Consequently, pulses are furnished to the step by step motor 2 until the movable assembly is located in the position determined by the absolute numerical code. Then, a second pulse ITER is produced and the output Q of the second stage 312 of the computer 31 passes to the ONE state.

The NO-AND gate 323 then furnishes the complement of the output of the numerical comparator 333. The OR gate 374 responds to the information of sign contained in the one bit memory device 334, driving the trigger circuit 371 into the state for actuation for the step by step motor 2, which corresponds to the sign (in the case illustrated in FIG. 5, the direct sense, given by S 371 at zero level, corresponds to the value zero of the sign bit).

Consequently, the step by step motor 2 receives pulses equal in number to the number of steps contained in the register 332, after which the output of the numerical comparator 333 passes to ONE. The direction of movement of the step by step motor 2 is given by the sign memory device 334.

The embodiment of FIG. 5 therefore enables the movable assembly 5 to be located between two absolute positions given by the reglet 7, with the precision of the step by step motor 2. It will be understood that it is sufficient to use a step by step motor 2 of very low power to obtain extremely fine resolution of the movement of the movable assembly 5.

The known inconvenience of using an extremely fine resolution furnished by a step by step motor is that movements of large amplitude become very slow when driving is again effected by the step by step motor.

The present invention permits the production of movements of large amplitude at high speed by using successively a general control motor and a step by step motor, with reference to an absolute position coding system furnished by the strip 7. The precision with which the position determined by the absolute coding can be attained is comparable with the corresponding movement by one step of the step by step motor. It is then possible to use the step by step motor solely under pulse control, in order to obtain with the same precision a desired position, defined in relative manner with respect to the position determined on the reglet in absolute coding.

Furthermore, when only a step by step motor is used to control the movable assembly, an error of one step may be produced by parasitic pulses. This error persists by reason of the relative position coding, and may carry over to several successive operations. A plurality of errors may even add together, the more easily the greater the amplitudes of the movements.

In contrast, in accordance with the present invention every new working position is attained relative to absolute positions on the strip. The above-mentioned error may then be neglected in practice.

It will be noted that the duration of the pulses ITER is translated into a delay in the stopping of the motor system (motor 1 by the trigger circuit 221 and 222; motor 2 by the computer 31). It is desirable for this duration to be so short as not to be prejudicial to the precision of stopping.

Of course, the present invention is not limited to the practical forms described, which undergo numerous modifications, in particular as regards the logical circuits of FIGS. 2, 3 and 5.

We claim:

1. A positioning apparatus for positioning a movable assembly, comprising:
   a. a general control motor for moving said movable assembly,
   b. a stepping motor for moving said movable assembly,
   c. a stationary linear detection instrument including a series of transverse conductive lamellae insulated from one another, each adjacent pair of lamellae defining a different predetermined position along the path of travel of the movable assembly,
   d. means movable with the movable assembly and cooperable with said lamellae for successively short circuiting adjacent pairs of said lamellae,
   e. detection circuit means for producing an output signal only when said movable means (d) short circuts an adjacent pair of lamellae corresponding to a predetermined position of said movable assembly,
   f. additional detection means responsive to the reversal of direction of movement of said movable assembly for producing an output signal, and
   g. logic circuit means between said detection circuit means and said motors, said logic circuit means including:
      I. means for actuating said general control motor to move said movable assembly into a predetermined position and then past that position,
      II. means responsive to the output signal from said detection circuit means (e) for braking said general control motor and hence said movable assembly, and
      III. means responsive to said output signal from said additional detection means (f) for deactuating said general control motor and for actuating said stepping motor to move said movable assembly, in a direction opposite to the direction it was moved by said general control motor, back toward said predetermined position.

2. A positioning apparatus as defined in claim 1 including means responsive to an output signal from said detection circuit means, subsequent to the output signal which causes deactuation of said general control motor, for deactuating said stepping motor.

3. A positioning apparatus as defined in claim 1 wherein said logic circuit includes means responsive to said output signal from said detection circuit means for reversing the polarity of the actuating voltage applied to said general control motor to reverse the direction of movement of that motor and hence of the movable assembly prior to deactuation of said general control motor.

4. A positioning apparatus as defined in claim 3 wherein said stepping motor has a plurality of windings and is arranged to be driven by said general control motor, and said logic circuit means includes means for comparing the phase displacement of voltages produced by two of said windings upon reversal of said general control motor and producing in response to the comparison a signal for deactuating said general control motor and for actuating said stepping motor.

5. A positioning apparatus as defined in claim 4 wherein said logic circuit includes means for maintaining said general control motor actuated for a predetermined minimum period of time after it is initially actuated regardless of whether or not there is any output signal from said detection circuit means, thereby insuring the detection of a reversal of the general control motor.

6. A positioning apparatus as defined in claim 3 wherein said logic circuit includes means for continuing the actuation of said stepping motor for a preselected number of steps after the movable assembly reaches the predetermined position a second time.

7. A positioning apparatus as defined in claim 6 wherein said means for continuing for actuation of said stepping motor includes means for causing said stepping motor to move the preselected number of steps in a preselected direction.

8. The invention as claimed in claim 1, wherein the general control motor is a direct current motor.

9. The invention as claimed in claim 1, wherein said linear detection instrument comprises a strip having a plurality of closely spaced transverse conductors thereon.

* * * * *